(12) United States Patent
Vlaanderen et al.

(10) Patent No.: US 6,558,104 B1
(45) Date of Patent: May 6, 2003

(54) CONTAINER HANDLING SYSTEM FOR A VEHICLE

(75) Inventors: James A. Vlaanderen, Klemme, IA (US); Francis L. Zrostlik, deceased, late of Clear Lake, IA (US), by Barbara Zrostlik, legal representative

(73) Assignee: Stellar Industries, Inc., Garner, IA (US)

( * ) Notice: Subject to any disclaimer, the term of this patent is extended or adjusted under 35 U.S.C. 154(b) by 0 days.

(21) Appl. No.: 09/574,130

(22) Filed: May 18, 2000

(51) Int. Cl.[7] ................................................. B60P 1/28
(52) U.S. Cl. .................................... 414/498; 414/491
(58) Field of Search ....................... 414/495, 498–500, 414/546, 547, 491

(56) References Cited

U.S. PATENT DOCUMENTS

| | | | |
|---|---|---|---|
| 3,819,075 A | * 6/1974 | Derain | 214/505 |
| 3,874,537 A | 4/1975 | Kou | |
| 3,892,323 A | * 7/1975 | Corompt | 214/505 |
| 3,942,664 A | * 3/1976 | Lemaire | 214/505 |
| 4,175,904 A | 11/1979 | Airaksinen | |
| 4,204,793 A | 5/1980 | Lemaire | |
| 4,453,878 A | 6/1984 | Paukku | |
| 5,290,138 A | * 3/1994 | Smart et al. | 414/491 |
| 5,531,559 A | 7/1996 | Kruzick | |
| 5,542,807 A | 8/1996 | Kruzick | |
| 5,542,808 A | * 8/1996 | Chiron et al. | 414/498 |
| 5,601,393 A | 2/1997 | Waldschmitt | |
| 5,624,143 A | 4/1997 | Waldschmitt | |
| 5,725,350 A | 3/1998 | Christenson | |
| 5,967,735 A | * 10/1999 | Smart et al. | 414/498 |

* cited by examiner

*Primary Examiner*—Kathy Matecki
*Assistant Examiner*—Charles Fox
(74) *Attorney, Agent, or Firm*—Wood, Phillips, Katz, Clark & Mortimer

(57) ABSTRACT

Damage to a hook lift type of container handling system caused by torsional loading of a jib slidable within a tube or the like pivotably mounted on a frame carried by a vehicle is minimized by providing a secondary frame that is pivoted to the vehicle and which is made up of two spaced, parallel, tubular structures and a jib made up of two, parallel tube like structures telescopically, slidably received in the tube like structures of the second frame. The jib includes an upstanding hook and by reason of the spacing between the two tubes of both the jib and the secondary frame, a high resistance to torsional loading is provided, thereby eliminating damage as a result of torsional forces.

8 Claims, 4 Drawing Sheets

CONTAINER HANDLING SYSTEM FOR A VEHICLE

FIELD OF THE INVENTION

This invention relates to a container handling system for a vehicle, and more specifically, to a container handling system commonly known as a "hook lift".

BACKGROUND OF THE INVENTION

So-called "hook lifts" on trucks have been extensively employed for the transport of various materials in a container. In the usual case, the container may be loaded or unloaded upon the bed of the truck utilizing the hook lift system. One typical and frequent use for such systems is in the picking up and hauling of refuse. An open ended container may be delivered to a point of use and the hook lift used to deploy the container on the terrain underlying the truck where it is left to be filled with refuse or the like. When the container is full, the truck returns to the point where the container has been deposited and through use of the hook lift system, elevates the now full container onto the truck where it may be transported, along with its contents, to a point where the contents are deposited.

U.S. Pat. No. 3,892,323 issued Jul. 1, 1975 to Corompt discloses a particularly useful version of that system. A jib with an upright hook to engage the container is slidably mounted in a tube or the like for extension or retraction with respect thereto. The tube, oppositely of the jib, is connected to a frame element by a pivot which in turn is pivoted to the main frame or bed of the truck by another pivot located rearwardly of the first. A hydraulic cylinder is connected to the tube and a latching system is employed whereby when the jib is retracted, the tube and the pivotal frame move as a unitary part to allow the container to be dumped while still mounted on the track by elevating the frame with a hydraulic cylinder. On the other hand, when the jib is extended with respect to the tube, the tube is unlatched from the frame allowing the tube and jib only to be pivoted about the first mentioned pivot for loading or unloading the container from the vehicle. Thus, the system may be operated in a container loading mode, a container transporting mode, a container unloading mode, or a container dumping mode.

In spite of these advantages, the system of Corompt is not as useful as might be. Torsional loadings placed on the lift system as a result of uneven loading within the container from side to side or other forces imposed upon the jib when connected to the container can cause damage to the system.

Container handling systems of the type disclosed such as that of the above-identified Corompt patent also require some sort of a latch for latching the tube to the dump frame thereby disabling or rigidifying the pivotal connection between the two. This latch must be selectively operable and typically will be such that the two will be unlatched, and therefore able to pivot relative to one another, when the system is operating in the loading or unloading modes. On the other hand, when the system is operating in the transport or dumping modes, the latch should be engaged.

A latching system such as that shown by Corompt, therefore, is disabled when the jib is fully retracted with respect to the secondary frame. Systems heretofore designed typically include one or more pivots and return springs for a latch lever. In the environment in which such systems operate, the pivots may resist free movement of the latch lever as a result of corrosion, the intrusion of environmental materials, or the like and not operate satisfactorily to provide the desired latching or unlatching. Moreover, the use of pivots and springs adds to the complexity of the latching mechanism, thereby adding expense and making it more prone to failure.

The present invention is directed to a system having the advantages of that disclosed in Corompt, namely, operation in the four different modes mentioned previously and which provides a high measure of resistance to torsional loading so as to minimize or eliminate the possibility of damage to the system from such torsional loading and which may include an improved latching system.

SUMMARY OF THE INVENTION

It is the principal object of the invention to provide a new and improved container handling system for use with vehicles. More specifically, it is an object of the invention to provide such a system wherein torsional loading is greatly resisted by the system so as to avoid damage thereto and/or an improved latching system.

It is also an object of the invention to provide such a system that is operable in at least four modes, namely, a container loading mode, a container transporting mode, a container unloading mode and a container dumping mode.

An exemplary embodiment of the invention achieves the foregoing objects in a system that includes an elongated main frame adapted to be mounted on a vehicle and having spaced, generally parallel side rails, a front end and a rear end. Container engaging rollers are mounted for rotation at the rear end and a first pivot is located adjacent the rollers to define a first horizontal pivot axis extending between the side rails in a direction normal thereto. A dump frame is located between the side rails near the rear end and pivoted thereto by the first pivot to pivot about the first pivot axis. A secondary frame is located between the side rails and between the dump frame and the front end. The secondary frame includes two spaced, parallel, tubular or partially tubular members and a second pivot defining a second horizontal pivot axis parallel to the first pivot axis and pivoting the second frame to the dump frame at a location spaced from the first pivot axis in the direction of the front end. A sliding jib is provided and includes two spaced, parallel tubular or partially tubular members that are telescopically received in the tubular or partially tubular members of the secondary frame to be slidable with respect thereto. A hook element interconnects the tubular or partially tubular members of the sliding jib and extends upwardly therefrom to terminate in a hook located well above a plane defined by the tubular or partially tubular members of the sliding jib. First and second fluid cylinders are disposed within respective ones of said tubular or partially tubular members of the secondary frame and connected to respective ones of the tubular or partially tubular members of the sliding jib. The first and second cylinders are operable to extend or retract the sliding jib with respect to the secondary frame. At least one third fluid cylinder is connected to the main frame near the front end thereof and to the secondary frame and is operable to pivot the secondary frame about the second pivot axis and/or the dump frame about the first pivot axis. As a consequence, the hook may be moved to engage a container on terrain underlying the main frame for loading or unloading modes, moved to a position overlying a vehicle to which the main frame is mounted so as to dispose the container in a transporting mode, or to cause the dump frame and the secondary frame to move about the first axis in a unitary fashion to operate in a dumping mode.

By reason of the fact that the jib is made of two spaced tubular members, a high degree of rigidity is imparted thereto sufficient to highly resist torsional forces applied to the jib and the secondary frame and dump frame so as to minimize or eliminate the possibility of damage to the container handling system.

It is also an object of the invention to provide a new and improved latch for rigidifying the pivot between the dump frame and the secondary frame. According to one embodiment of the invention, such a latch includes a first latch element movable with the jib and a second latch element carried by the dump frame in position to be engaged by the first latch element for the purpose of rigidifying the second pivot except when the jib is fully retracted. Preferably, the first latch element includes a relatively short tab carried by the jib and directed toward the dump frame and the second latch includes a relatively long tab overlying the short tab in interference relation. The length of the relatively long tab is such as to stop short of overlying the relatively short tab when the jib is fully retracted.

In a highly preferred embodiment, the tube member in which the jib is telescopically received has an elongated slot facing the dump frame and the relatively short tab is located to extend through the slot toward the dump frame to underlie the tab thereon.

Other objects and advantages will become apparent from the following specification taken in connection with the accompanying drawings.

DESCRIPTION OF THE PREFERRED EMBODIMENTS

Figure 1:
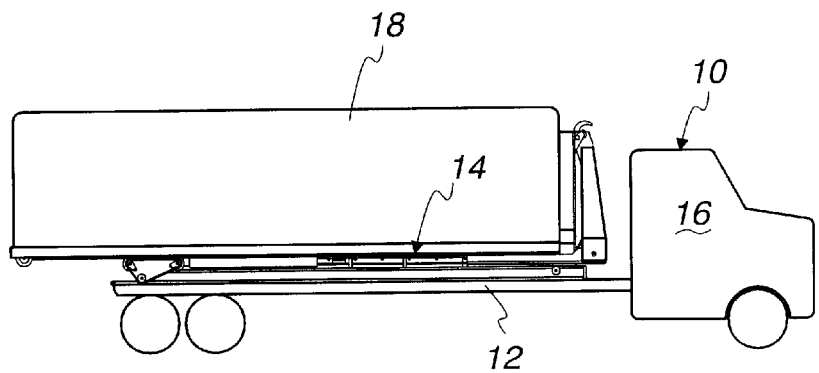
FIG. 1 is a side elevation of a vehicle having a container handling system made according to the invention disposed thereon and illustrated in a transport configuration.

A container handling system made according to the invention is primarily intended for use with a wheeled vehicle such as a truck, generally designated 10, having a rearwardly extending bed 12. The container handling system is generally designated 14 and is mounted on the bed 12 rearwardly of the cab 16 of the truck 10. As illustrated in FIG. 1, an open topped container 18, shown in the form of a rectangular solid, has been moved by the container handling system to a position overlying the bed 12 of the truck 10 for transport thereon.

Figure 2:
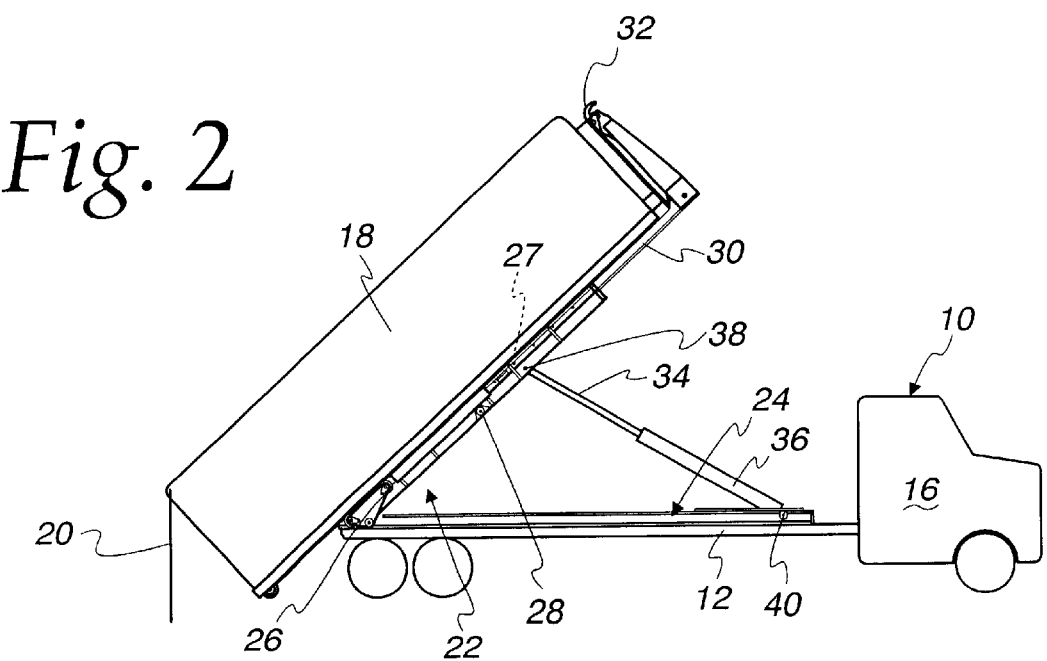
FIG. 2 is a view similar to FIG. 1 but illustrating the configuration of the components for a dumping operation.

FIG. 2 illustrates the container 18 in a dumping configuration whereat a door 20 on the rear of the container 18 may open so as to allow the contents to spill from the container 18. In this configuration, a dump frame, generally designated 22 and pivoted to a main frame, generally designated 24, of the container handling system at a pivot 26 along with a secondary frame 27 pivoted to the dump frame 28 and a jib 30 that telescopes within the secondary frame 27 and terminates in an upwardly directed hook 32 by which the container 18 may be hooked, move in a unitary fashion as a result of the extension of a rod 34 of a piston 36. The rod 34 is pivoted to the secondary frame 26 at a pivot 38 while the cylinder end of the cylinder 36 is pivoted to the main frame 24 by a pivot 40. It will be noted that in the configuration in FIG. 2, the pivot 28 has been immobilized or rigidified by means to be described hereinafter so that the dump frame 22, the secondary frame 27 and the lower part of the jib 30 define a straight line with respect to one another.

Figure 3:
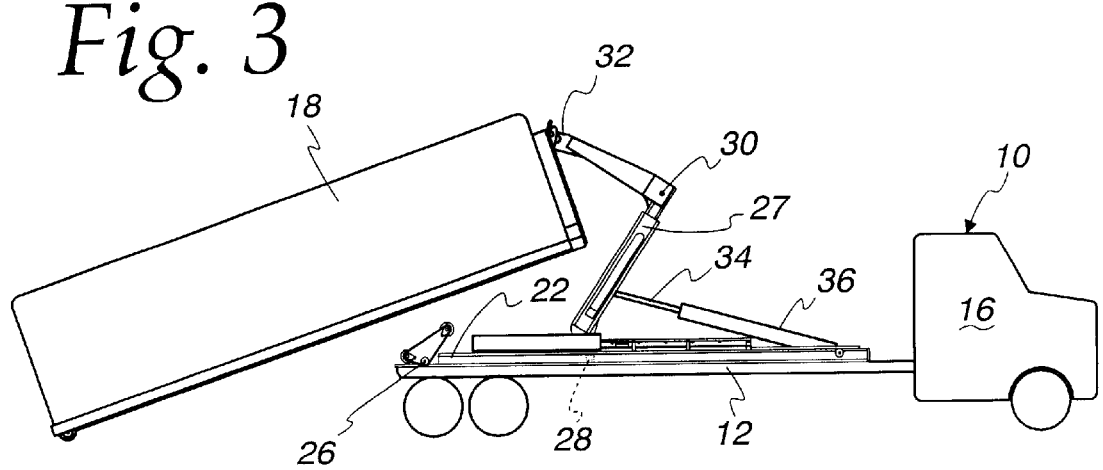
FIG. 3 is a view similar to FIGS. 1 and 2 but illustrating the configuration of the components in a typical loading or unloading operation.

FIG. 3 illustrates the configuration of the components when loading or unloading the container 18 from the bed 12 of the truck 10. In this case, the secondary frame 27 is permitted to pivot about the pivot 28 to the dump frame 22 which is free to pivot about the pivot 26 to the main frame 24. The jib 30 is retracted with respect to the secondary frame 27 and further extension of the rod 34 of the cylinder 36 will result in the container 18 being moved rearwardly of the end of the main frame 12 and lowered to the underlying terrain when the container 18 is being unloaded. In loading the container 18, the action is reversed and the cylinder 36 retracted and then the jib 30 extended to move the container 18 to the transport position illustrated in FIG. 1.

Figure 4:
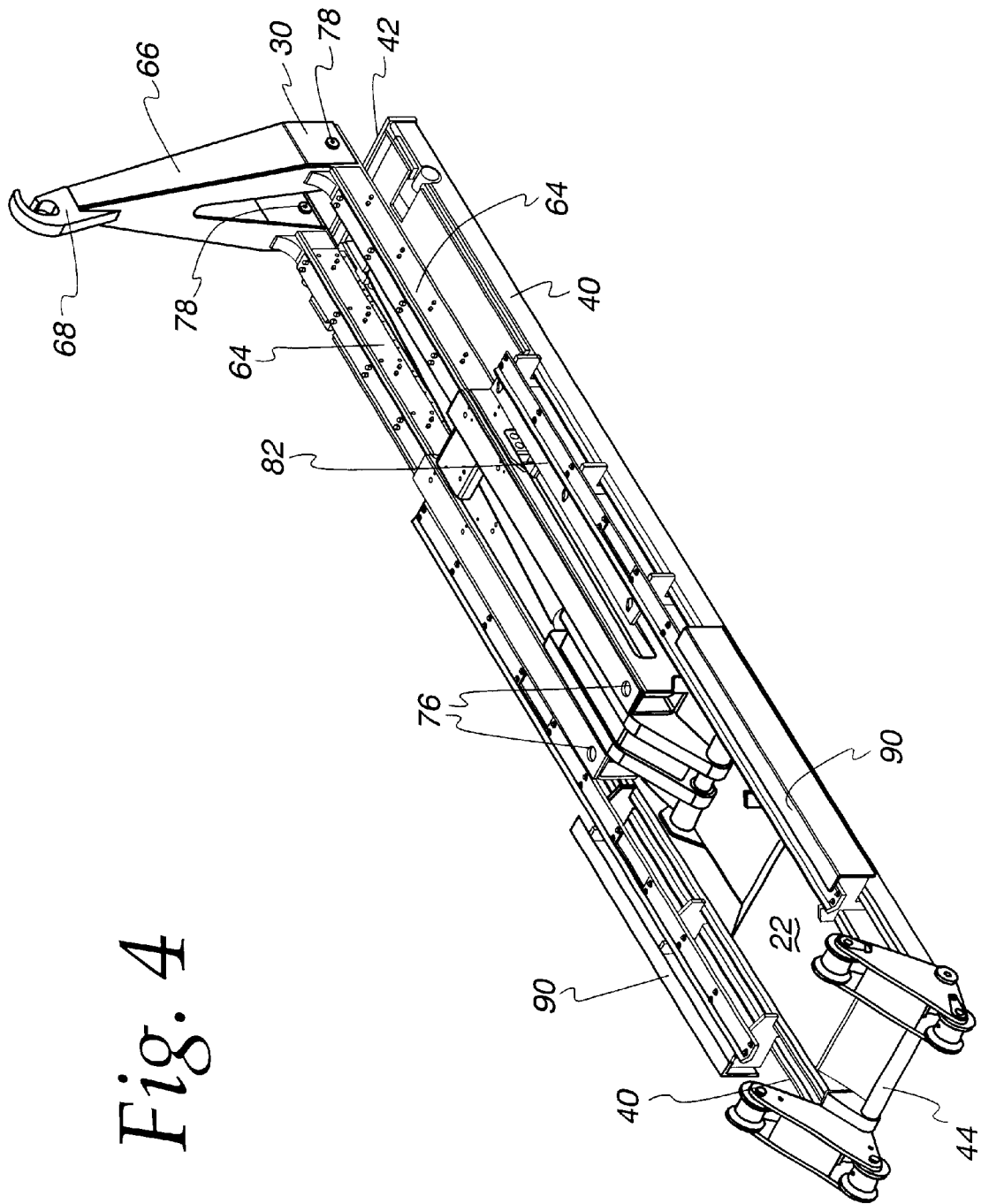
FIG. 4 is an enlarged, perspective view of the container handling system apart from the vehicle and with the jib extended.
Figure 5:
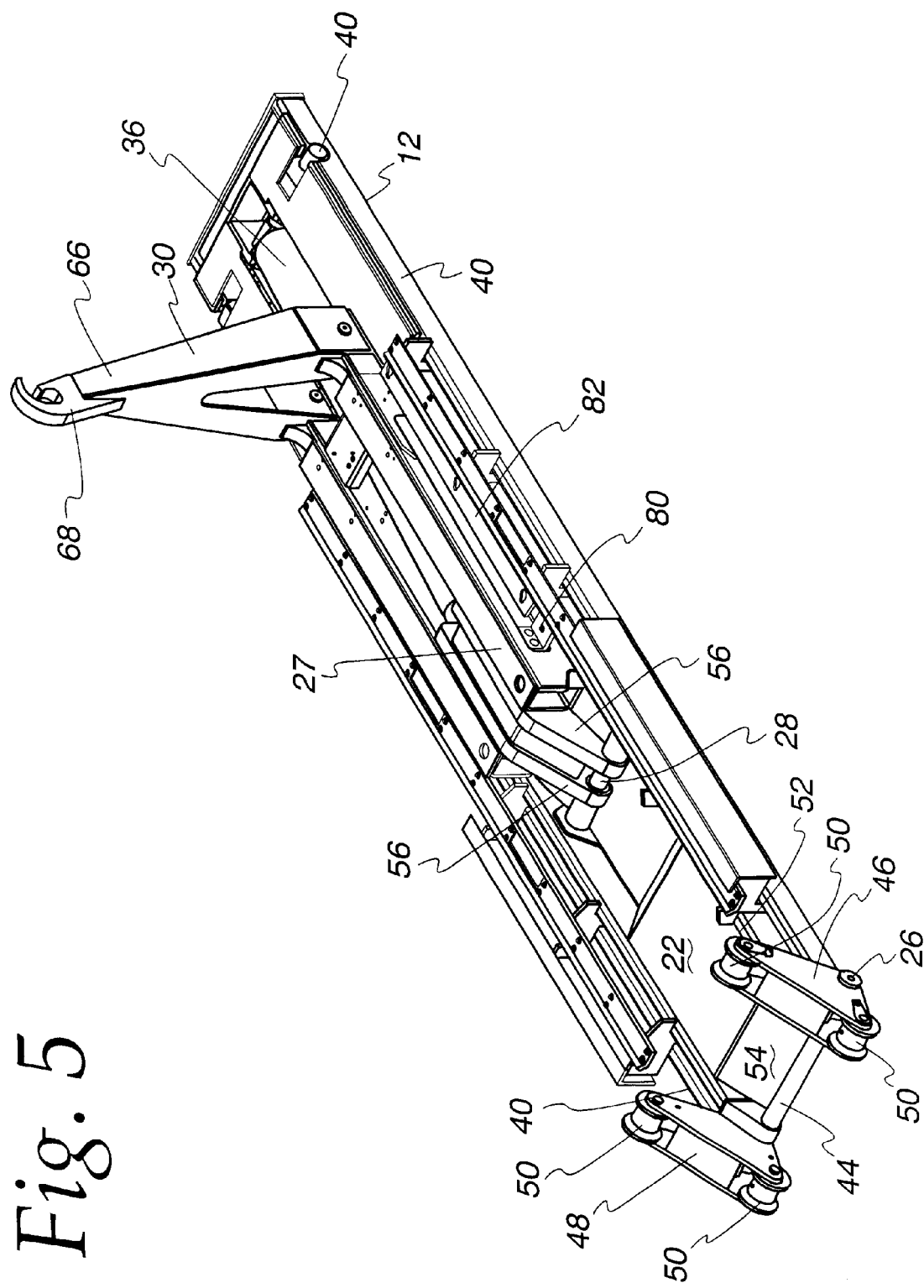
FIG. 5 is a view similar to FIG. 4 but with the jib fully retracted.
Figure 6:
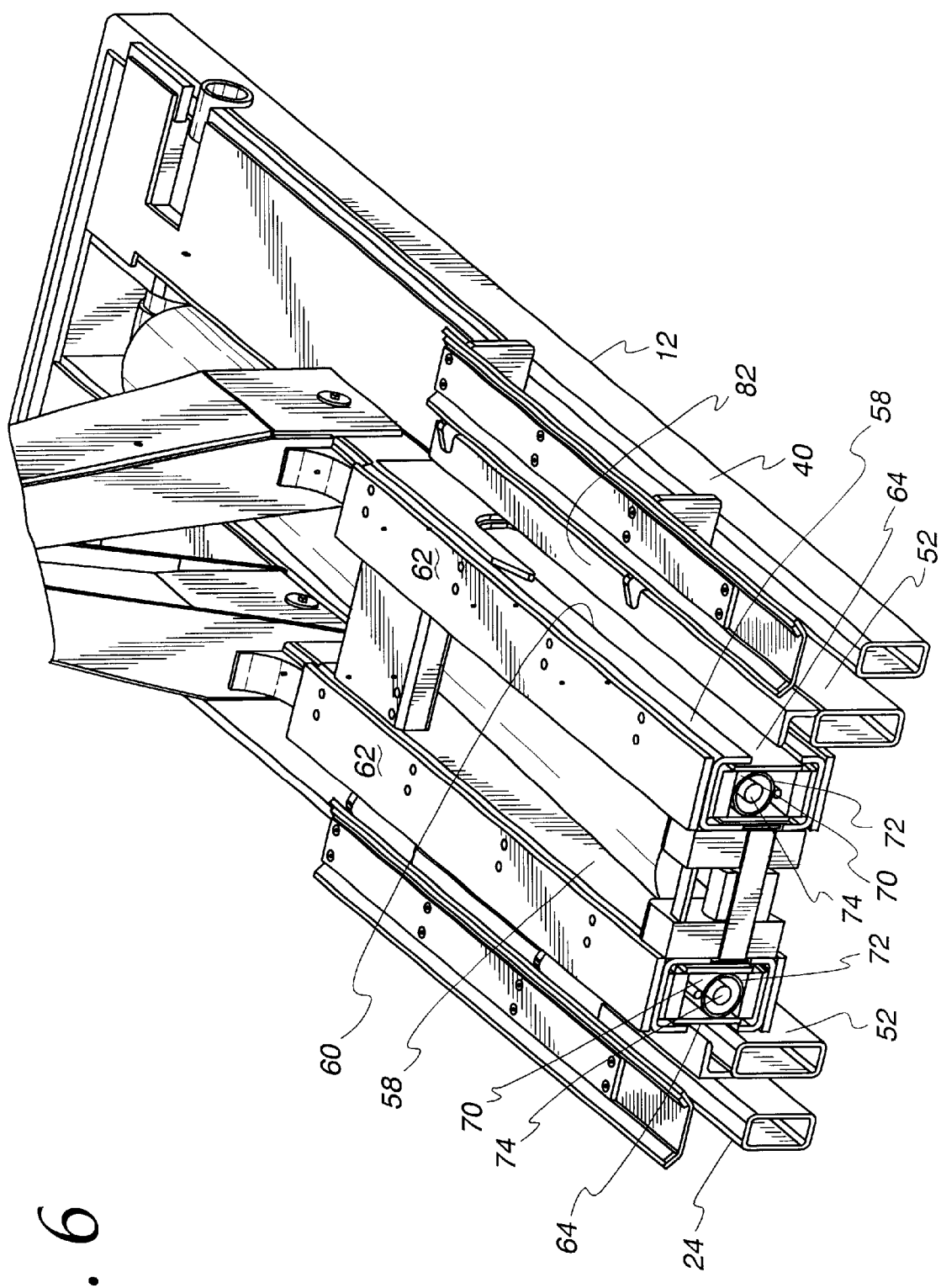
FIG. 6 is an enlarged perspective view of the container handling system with the jib fully retracted and with parts shown in section for clarity.

Turning now to FIGS. 4–6, inclusive, the container handling system 14 will be described in greater detail.

The main frame 12 is made up of two, elongated, tubes 40 of rectangular cross-section. A cross piece 42 interconnects the tubes 40 at their forward or front end, that is, the end nearest the cab 16 of the truck 10. A cross bar 44 which may in the form of a circular tube provides a similar connection at the rear end of the tubes 40 and serves as a pivot for spaced roller carriers 46, 48, each mounting two rollers 50. As is well known, the rollers 50 guide the container 18 (FIGS. 1–3) during movement onto or off of the vehicle 10. The cross bar 44 also defines the pivot 26 for the dump frame 22 which also is made up of a pair of spaced, parallel tubes 52 whose rearward ends are connected by plates 54.

The pivot 28 is located forwardly of the pivot 26 and as seen in FIGS. 4 and 5, pivotally mounts blocks 56 forming part of the secondary frame 27. As perhaps best seen in FIG. 6, the secondary frame is made of two parallel, spaced tubes of rectangular cross section and designated 58. The tubes 58 are nested between the tubes 52 and each includes an elongated slot 60 (only one of which is shown) in its side facing the tubes 52 forming the dump frame for purposes to be seen. Wear pads 62 may be disposed on the top of the tubes 40 and 64.

Referring to FIG. 4, the jib 30 is defined by two spaced parallel, elongated tubes, also of rectangular cross section and designated 62. The tubes 64 are sized so as to be slidably and telescopically within the tubes 58 defining the secondary frame. An upstanding A-frame structure 66 is secured to the tubes 64 at their forward ends and terminates at its upper end in a hook 68 of conventional construction which opens generally forwardly.

Located within each of the tubes 64 is a hydraulic cylinder 70, the cylinder 72 of which is shown in section in FIG. 6. Also illustrated are the piston rods 74 for the cylinders 70. The cylinder ends of the cylinder 70 are pivoted as at 76 (FIG. 4) to the tubes 58 forming the secondary frame 27 while the rod ends are pivoted as at 78 to the base of the A-frame 66, also as shown in FIG. 4.

As a result of that construction, the jib 30 may be moved between a fully retracted position as illustrated in FIG. 5 and a fully extended position as illustrated in FIG. 4 as well as intermediate positions in between.

A substantial advantage of the construction just described is the fact that the use of the spaced, parallel tubes 64 of the jib 30 telescoping within the spaced, parallel tubes 58 of the secondary frame 27, torsional loading of the system as a result of an unbalanced container or uneven terrain and applied to the system via the hook 68 is strongly resisted and thereby prevents damage to the system that might otherwise be imposed by such torsional loading.

In addition to the foregoing, each of the tubes 64 making up the jib 30 includes a short section of angle iron 80 which defines a tab that extends through the slot 60 in the associated tube 58 making up the secondary frame 27 to serve as the first part of a latch. The slots 60 face the tubes 52. As can be seen from FIG. 5, the angle iron 80 provides a horizontally directed tab of a short length considered from front to back of the apparatus.

An inverted angle iron 82 of substantial length is welded to the upper side of each of the tubes 52 so as to have its upper edge directed inwardly toward the slot 60 in the adjacent tubes 58. The arrangement is such that the angle irons 82 overlie the tabs 80 in interference relation except for one circumstance. Specifically, the length of the angle irons 82 is made sufficiently short as to not overlie tabs 80 when the jib 30 is fully retracted as illustrated in FIG. 5.

As a result of this construction, a latching system is formed whereby when the jib 30 is fully retracted, the secondary frame 27 is free to pivot about the pivot 28 relative to the dump frame 22. Conversely, as soon as the jib 30 is extended, the above described interference relation exists and the secondary frame 27 and the dump frame move in unison. Thus, the tabs 82 and the longer flanges 82 provide an extremely simple system for latching the secondary frame 27 to the dump frame 22 for dumping purposes. The latch system includes no moving parts (other than the jib 30 which necessarily must move), and thus may be made extremely rugged and yet of inexpensive construction that is not at all prone to failure.

What is claimed is:

1. A container handling system for a vehicle, comprising:
   an elongated main frame adapted to be mounted on a vehicle and having spaced, generally parallel side rails, a front end and a rear end;
   container engaging rollers mounted for rotation at said rear end;
   a first pivot adjacent said rollers defining a first horizontal pivot axis extending between said side rails in a direction normal thereto;
   a dump frame located between said side rails near said rear end and pivoted thereto by said first pivot to pivot about said first pivot axis;
   a secondary frame located between said side rails and between said dump frame and said front end, said secondary frame including two spaced, parallel tubular or partially tubular members and a second pivot defining a second horizontal pivot axis parallel to said first pivot axis and pivoting said secondary frame to said dump frame at a location intermediate the ends of the dump frame and spaced from said first pivot axis in the direction of said front end;
   a selectively operable latch for rigidifying said second pivot;
   a sliding jib including two spaced, parallel tubular or partially tubular members telescopingly received in the tubular or partially tubular members of said secondary frame and slidable with respect thereto, and a hook element interconnecting said tubular or partially tubular members of said sliding jib and extending upwardly therefrom to terminate in a hook located well above a plane defined by said tubular or partially tubular members of said sliding jib;
   first and second fluid cylinders within respective ones of said tubular or partially tubular members of said secondary frame and connected to respective ones of said tubular or partially tubular members of said sliding jib and operable to extend or retract said sliding jib with respect to said secondary frame; and
   at least a third fluid cylinder connected to said main frame near said front end and to said secondary frame and operable to pivot said secondary frame about said second axis and/or said dump frame about said first axis;
   said latch including a first latch element mounted on and movable with said jib and a second latch element carried by said dump frame and positioned to be engaged by said first latch element to rigidify said second pivot for essentially all positions of movement of said jib relative to said second frame except when said jib is fully retracted into said secondary frame;
   whereby said hook may be moved to engage a container on terrain underlying said main frame and lift the same onto the vehicle on which the main frame is mounted, to engage a container on the vehicle and deposit the same on the underlying terrain or to move a container on the vehicle on which the main frame is mounted to a dumping position on the vehicle.

2. A container handling system for a vehicle, comprising:
   an elongated main frame adapted to be mounted on a vehicle and having spaced, generally parallel side rails, a front end and a rear end;
   container engaging rollers mounted for rotation at said rear end;
   a first pivot adjacent said rollers defining a first horizontal pivot axis extending between said side rails in a direction normal thereto;
   a dump frame located between said side rails near said rear end and pivoted thereto by said first pivot to pivot about said first pivot axis;
   a secondary frame located between said side rails and between said dump frame and said front end, said secondary frame including two spaced, parallel tubular or partially tubular members and a second pivot defining a second horizontal pivot axis parallel to said first pivot axis and pivoting said secondary frame to said dump frame at a location intermediate the ends of the dump frame and spaced from said first pivot axis in the direction of said front end;
   a selectively operable latch for rigidifying said second pivot;
   a sliding jib including two spaced, parallel tubular or partially tubular members telescopingly received in the tubular or partially tubular members of said secondary frame and slidable with respect thereto, and a hook element interconnecting said tubular or partially tubular members of said sliding jib and extending upwardly therefrom to terminate in a hook located well above a plane defined by said tubular or partially tubular members of said sliding jib;
   first and second fluid cylinders within respective ones of said tubular or partially tubular members of said secondary frame and connected to respective ones of said tubular or partially tubular members of said sliding jib and operable to extend or retract said sliding jib with respect to said secondary frame; and at least a third fluid cylinder connected to said main frame near said front end and to said secondary frame and operable to pivot said secondary frame about said second axis and/or said dump frame about said first axis;

said latch including a relatively short tab immovably fixed to and carried by said jib and directed toward said dump frame and a relatively long tab overlying said short tab in interference relation and having a length such as to stop short of overlying said relatively short tab when said jib is fully retracted into said secondary frame, said long tab being carried and immovably fixed to said dump frame;

whereby said hook may be moved to engage a container on terrain underlying said main frame and lift the same onto the vehicle on which the main frame is mounted, to engage a container on the vehicle and deposit the same on the underlying terrain or to move a container on the vehicle on which the main frame is mounted to a dumping position on the vehicle.

3. The container handling system of claim 1 wherein said first latch element includes a relatively short tab carried by said jib and directed toward said dump frame and said second latch element includes a relatively long tab overlying said short tab in interference relation, the length of said relatively long tab being such as to stop short of overlying said relatively short tab when said jib is fully retracted into said secondary frame.

4. The container handling system of claim 3 wherein at least one of said tubular or partially tubular members of said secondary frame has an elongated slot facing said dump frame and said relatively short tab is located on at least the tubular or partially tubular member of said jib located within said at least one tubular or partially tubular member of said secondary frame and extends through said elongated slot toward said relatively long tab.

5. A container handling system for a vehicle, comprising:

an elongated main frame adapted to be mounted on a vehicle and having spaced, generally parallel side rails, a front end and a rear end;

container engaging rollers mounted for rotation at said rear end;

a first pivot adjacent said rollers defining a first horizontal pivot axis extending between said side rails in a direction normal thereto;

a dump frame located between said side rails near said rear end and pivoted thereto by said first pivot to pivot about said first pivot axis;

a secondary frame located between said side rails and between said dump frame and said front end, said secondary frame including a tubular or partially tubular member and a second pivot defining a second horizontal pivot axis parallel to said first pivot axis and pivoting said secondary frame to said dump frame at a location intermediate the ends of the dump frame and spaced from said first pivot axis in the direction of said front end;

a sliding jib including a tubular or partially tubular member telescopingly received in the tubular or partially tubular member of said secondary frame and slidable with respect thereto, and a hook element mounted on said tubular or partially tubular member of said sliding jib and extending upwardly therefrom to terminate in a hook;

a fluid cylinder within said tubular or partially tubular member of said secondary frame and connected to said tubular or partially tubular member of said sliding jib and operable to extend or retract said sliding jib with respect to said secondary frame; and a further fluid cylinder connected to said main frame near said front end and to said secondary frame and operable to pivot said secondary frame about said second axis and/or said dump frame about said first axis; and a latch for selectively rigidifying said second pivot including a relatively short tab carried by the tubular or partially tubular member of said jib and a relatively long tab carried by said dump frame and having a length sufficient to substantially overlie said short tab in interference relation for all positions of said jib with respect to said secondary frame except a fully retracted position;

whereby said hook may be moved to engage a container on terrain underlying said main frame and lift the same onto the vehicle on which the main frame is mounted, to engage a container on the vehicle and deposit the same on the underlying terrain or to move a container on the vehicle on which the main frame is mounted to a dumping position on the vehicle.

6. The container handling system of claim 5 wherein said tubular or partially tubular member of said secondary frame includes an elongated slot facing said dump frame through which said relatively short tab extends to underlie said relatively long tab.

7. The container handling system of claim 6 wherein said secondary frame is made of two of said tubular or partially tubular members in parallel spaced relation and said jib has two of said tubular or partially tubular members telescopingly received for sliding movement in the members of said secondary frame.

8. The container handling system of claim 5 wherein said short tab is immovably affixed to the tubular or partially tubular member of said jib and said relatively long tab is immovably fixed to said dump frame.

* * * * *